(12) United States Patent
Mimura (10) Patent No.: US 8,235,823 B2
(45) Date of Patent: Aug. 7, 2012

(54) GAME DEVICE, METHOD OF CONTROLLING A GAME DEVICE, AND INFORMATION STORAGE MEDIUM

(75) Inventor: Ryuji Mimura, Tokyo (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 129 days.

(21) Appl. No.: 12/748,858

(22) Filed: Mar. 29, 2010

(65) Prior Publication Data

US 2010/0248845 A1 Sep. 30, 2010

(30) Foreign Application Priority Data

Mar. 30, 2009 (JP) ................................ 2009-083652

(51) Int. Cl.
*A63F 9/24* (2006.01)
*A63F 13/00* (2006.01)
*G06F 17/00* (2006.01)
*G06F 19/00* (2006.01)

(52) U.S. Cl. ......... 463/43; 463/3; 463/5; 463/7; 463/36; 463/37; 273/371; 273/374

(58) Field of Classification Search .................. 463/3, 5, 463/7, 36, 37, 43; 273/371, 374
See application file for complete search history.

(56) References Cited

U.S. PATENT DOCUMENTS

| | | | |
|---|---|---|---|
| 2006/0217188 A1 * | 9/2006 | Walker et al. | 463/25 |
| 2006/0287094 A1 * | 12/2006 | Mahaffey et al. | 463/42 |
| 2007/0265043 A1 * | 11/2007 | Wang et al. | 463/2 |
| 2010/0210341 A1 * | 8/2010 | Elder | 463/20 |

FOREIGN PATENT DOCUMENTS

| | | | |
|---|---|---|---|
| JP | 2004275229 | * | 7/2004 |
| JP | 2004-275229 A | | 10/2004 |

* cited by examiner

*Primary Examiner* — David L Lewis
*Assistant Examiner* — Adetokunbo Torimiro
(74) *Attorney, Agent, or Firm* — Sughrue Mion, PLLC

(57) ABSTRACT

A target output control section causes, after a game has started, a target which a user needs to achieve in the game to be output. A target output standby section holds the target output by the target output control section on standby based on an achievement status for the target.

12 Claims, 10 Drawing Sheets

TO WIN MATCH WITH NUMBER OF SHOTS BEING ○○ OR MORE

FIG.4

TO WIN MATCH WITH NUMBER OF SHOTS BEING 18 OR MORE

| TARGET ID | TARGET |
|---|---|
| 01 | TO WIN MATCH WITH NUMBER OF SHOTS BEING 18 OR MORE |
| 02 | TO WIN MATCH WITH NUMBER OF SHOTS BEING 12 OR LESS |
| 03 | TO WIN MATCH BY MAKING MORE SHOTS THAN OPPONENT BY 5 OR MORE |
| 04 | TO WIN MATCH BY SCORING WITH SHOT FROM 25 METERS OR LONGER |
| 05 | TO KEEP STATE IN WHICH SCORE DIFFERENCE AGAINST OPPONENT IS +2 OR LARGER UNTIL MATCH IS ENDED |
| 06 | TO MAKE SCORE DIFFERENCE AGAINST OPPONENT +3 OR LARGER |
| ... | ... |

FIG.7

| TARGET ID | OUTPUT TIME CANDIDATE | OUTPUT CONDITION |
|---|---|---|
| 01 | 30:00 | NUMBER OF SHOTS<6 |
| | 45:00 | NUMBER OF SHOTS<9 |
| | 60:00 | NUMBER OF SHOTS<12 |
| | 75:00 | — |
| ... | ... | ... |

| TARGET GROUP ID | TARGET ID | CONDITION | TARGET |
|---|---|---|---|
| 01 | 01-1 | OPPONENT TEAM IS NOT STRONGER THAN USER TEAM | TO WIN MATCH WITH NUMBER OF SHOTS BEING 18 OR MORE |
| | 01-2 | OPPONENT TEAM IS STRONGER THAN USER TEAM | TO WIN MATCH WITH NUMBER OF SHOTS BEING 12 OR MORE |
| ... | ... | ... | ... |
| 04 | 04-1 | OPPONENT TEAM IS NOT STRONGER THAN USER TEAM | TO WIN MATCH BY SCORING WITH SHOT 25 METERS OR LONGER |
| | 04-2 | OPPONENT TEAM IS STRONGER THAN USER TEAM | TO WIN MATCH BY SCORING WITH SHOT 15 METERS OR LONGER |
| ... | ... | ... | ... |

FIG.11

| TARGET ID | OUTPUT TIME CANDIDATE | OUTPUT CONDITION |
|---|---|---|
| 01-1 | 30:00 | NUMBER OF SHOTS<6 |
| | 45:00 | NUMBER OF SHOTS<9 |
| | 60:00 | NUMBER OF SHOTS<12 |
| | 75:00 | — |
| 01-2 | 30:00 | NUMBER OF SHOTS<4 |
| | 45:00 | NUMBER OF SHOTS<6 |
| | 60:00 | NUMBER OF SHOTS<8 |
| | 75:00 | — |
| ... | ... | ... |

FIG.12

| TARGET ID | CHANGE TIME | CHANGE CONDITION | TARGET AFTER CHANGE |
|---|---|---|---|
| 01 | 30:00 | NUMBER OF SHOTS<3 | TO WIN MATCH WITH NUMBER OF SHOTS BEING 12 OR MORE |
| ... | ... | ... | ... |

FIG.13

| TARGET ID | OUTPUT TIME CANDIDATE | OUTPUT CONDITION | |
|---|---|---|---|
| | | CASE WHERE TARGET HAS NOT BEEN CHANGED | CASE WHERE TARGET HAS BEEN CHANGED |
| 01 | 30:00 | NUMBER OF SHOTS<6 | NUMBER OF SHOTS<4 |
| | 45:00 | NUMBER OF SHOTS<9 | NUMBER OF SHOTS<6 |
| | 60:00 | NUMBER OF SHOTS<12 | NUMBER OF SHOTS<8 |
| | 75:00 | — | — |
| ... | ... | ... | ... |

FIG.14

GAME DEVICE, METHOD OF CONTROLLING A GAME DEVICE, AND INFORMATION STORAGE MEDIUM

CROSS-REFERENCE TO RELATED APPLICATION

The present application claims priority from Japanese application JP 2009-083652 filed on Mar. 30, 2009, the content of which is hereby incorporated by reference into this application.

BACKGROUND OF THE INVENTION

1. Field of the Invention

The present invention relates to a game device, a method of controlling a game device, and an information storage medium.

2. Description of the Related Art

A game, which is configured such that a target which a user needs to achieve is presented before a game is started, and the user aims to achieve the target, is known (JP 2004-275229 A). In such a game, the user may enjoy a feeling of tension about whether or not the target can be achieved.

SUMMARY OF THE INVENTION

For example, in a sports game such as a soccer game, such a case is conceivable where the user is given a target which requires the user "to make a shot 10 times or more". However, in this case, if the user achieves the target in the middle of the match, the feeling of tension (feeling of tension about whether or not the target can be achieved) to be experienced by the user decreases in a period that follows (period until the match is ended). In particular, a highly skilled user may be able to achieve the target at a relatively early time point. In such a case, the user plays the game with a decreased feeling of tension for a relatively long period.

The present invention has been made in view of the above-mentioned problem, and therefore has an object to provide a game device, a method of controlling a game device, and an information storage medium which are capable of preventing, in a game configured such that a user aims to achieve a target, a decrease in feeling of tension (feeling of tension about whether or not the target can be achieved) to be experienced by the user.

In order to solve the above-mentioned problem, a game device according to the present invention is a game device for executing a game, including: a target output control section for causing, after the game has started, a target which a user needs to achieve in the game to be output; and a target output standby section for holding the output of the target by the target output control section on standby based on an achievement status for the target.

Further, a method of controlling a game device according to the present invention is a method of controlling a game device for executing a game, including: a target output control step of causing, after the game has started, a target which a user needs to achieve in the game to be output; and a target output standby step of holding the output of the target by the target output control step on standby based on an achievement status for the target.

Further, a program according to the present invention is a program for causing a computer, such as a consumer game machine (stationary game machine), a portable game machine, an arcade game machine, a mobile phone, a personal digital assistant (PDA), or a personal computer, to function as a game device for executing a game, the program further causing the computer to function as: a target output control section for causing, after the game has started, an output of a target which a user needs to achieve in the game to be output; and a target output standby section for holding the output of the target by the target output control section on standby based on an achievement status for the target.

Further, an information storage medium according to the present invention is an information storage medium storing the above-mentioned program.

According to the present invention, it becomes possible to prevent, in the game configured such that the user aims to achieve the target, the decrease in feeling of tension (feeling of tension about whether or not the target can be achieved) to be experienced by the user.

Further, according to an aspect of the present invention, the target output standby section may include: a section for acquiring content stored in a storage storing an achievement status condition in association with each of a plurality of output time candidates, the achievement status condition being a condition regarding the achievement status for the target; a section for judging, in a case where anyone of the plurality of output time candidates has arrived, whether or not the achievement status for the target at the output time candidate satisfies the achievement status condition associated with the output time candidate; and a section for allowing, in a case where it is judged that the achievement status for the target satisfies the achievement status condition, the target output control section to output the target.

Further, according to an aspect of the present invention, the target output control section may include: a section for causing a part of a content of the target to be output; and a section for causing the whole of the content of the target to be output after the part of the content of the target is output and the game has started. The target output standby section may hold the output of the whole of the content of the target on standby based on the achievement status for the target.

Further, according to an aspect of the present invention, the game may include a game played between one of a first game character and a first game character group, and one of a second game character and a second game character group, the first game character and the first game character group each being an operation subject of the user, the second game character and the second game character group each being an operation subject of one of another user and a computer. The game device may further include a first target changing section for changing the target based on a combination of the one of the first game character and the first game character group, and the one of the second game character and the second game character group.

Further, according to an aspect of the present invention, the game device may further include a second target changing section for changing the target based on the achievement status for the target after the game has started.

DETAILED DESCRIPTION OF THE INVENTION

Hereinafter, detailed description is given of an example of an embodiment of the present invention with reference to the drawings. A game device according to the embodiment of the present invention is implemented by, for example, a consumer game machine (stationary game machine), a portable game machine, a personal computer, a mobile phone, or a personal digital assistant (PDA). In this specification, description is given of a case in which the game device according to the embodiment of the present invention is implemented by a consumer game machine.

Figure 1:
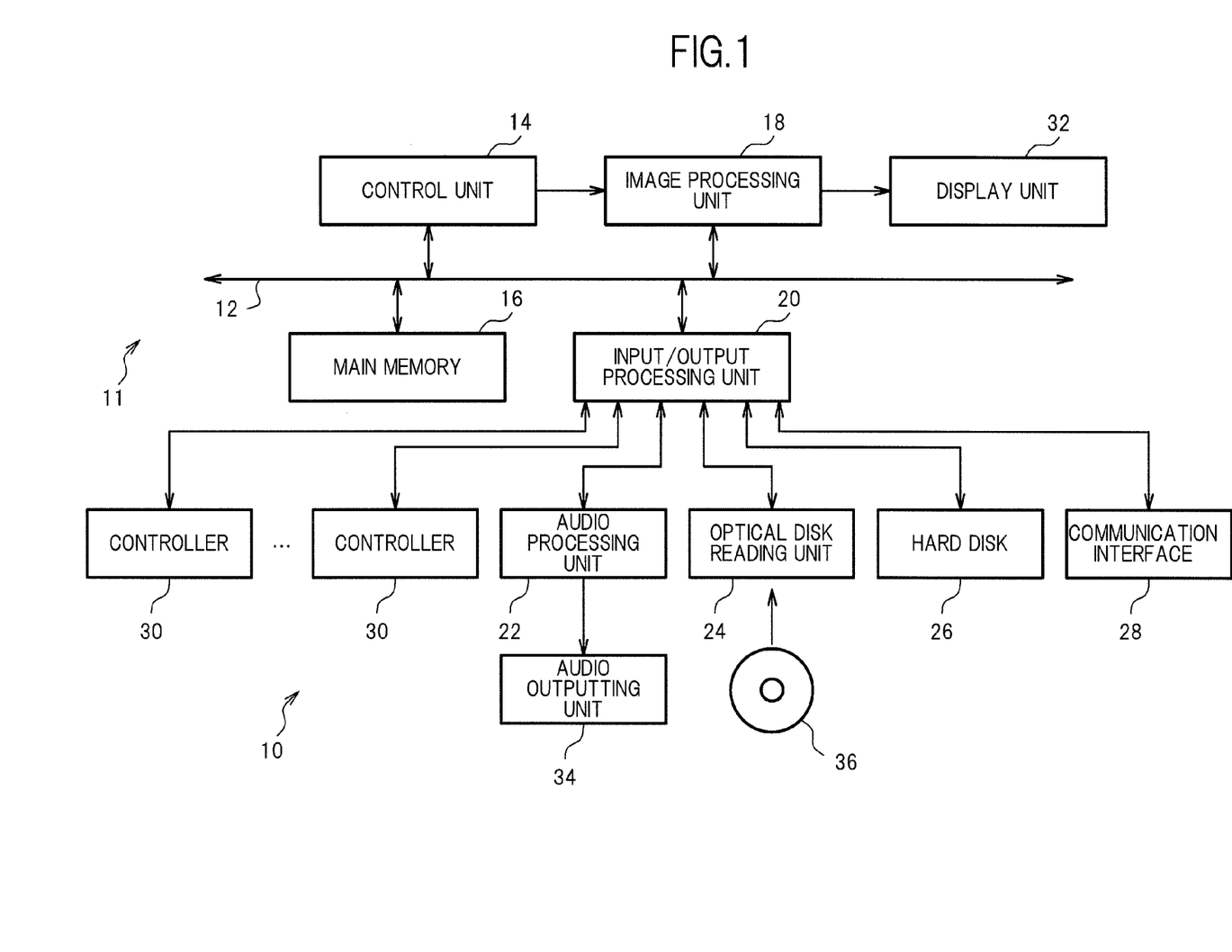
FIG. 1 is a diagram illustrating a hardware configuration of a game device according to an embodiment of the present invention.

FIG. 1 is a diagram illustrating a hardware configuration of a game device 10 according to the embodiment of the present invention. As illustrated in FIG. 1, the game device 10 includes a consumer game machine 11, a display unit 32, an audio outputting unit 34, and an optical disk 36 (information storage medium). The display unit 32 is a display device such as a television set or a liquid crystal display, for example. The audio outputting unit 34 is an audio outputting device such as a speaker or headphones, for example.

The consumer game machine 11 is a computer game system. The consumer game machine 11 includes a bus 12, a control unit 14, a main memory 16, an image processing unit 18, an input/output processing unit 20, an audio processing unit 22, an optical disk reading unit 24, a hard disk 26, a communication interface 28, and a controller 30.

The control unit 14 includes one or a plurality of microprocessors. The control unit 14 executes various types of information processing based on an operating system stored in a ROM (not shown), or a program read from the optical disk 36. The main memory 16 includes, for example, a RAM. The program and data read from the optical disk 36 are written into the main memory 16 as necessary. The main memory 16 is also used as a working memory for the control unit 14.

The bus 12 is used for exchanging addresses and data among the components of the consumer game machine 11. The image processing unit 18 includes a VRAM, and renders, based on image data supplied from the control unit 14, a game screen in the VRAM. Then, the image processing unit 18 converts the game screen rendered in the VRAM into video signals, and outputs the video signals to the display unit 32.

The input/output processing unit 20 is an interface for the control unit 14 to access the audio processing unit 22, the optical disk reading unit 24, the hard disk 26, the communication interface 28, and the controller 30. The audio processing unit 22 includes a sound buffer, and outputs, from the audio outputting unit 34, various types of audio data (for example, game music, game sound effects, dialogue, etc.) that have been read from the optical disk 36 into the sound buffer. The communication interface 28 is an interface for connecting the consumer game machine 11 to a communication network by wire or wireless.

The optical disk reading unit 24 reads a program or data recorded on the optical disk 36. In this specification, the optical disk 36 is used for supplying the program or the data to the consumer game machine 11. Alternatively, another information storage medium, such as a memory card, may be used. Alternatively, the program or the data may be supplied to the consumer game machine 11 from a remote place via a communication network such as the Internet, for example. The hard disk 26 is a commonly-used hard disk device (auxiliary storage device). It should be noted that the program and the data, which are supposed to be stored in the optical disk 36 in the following description, may be stored in the hard disk 26.

The controller 30 is an operation unit for a user to perform various types of game operations. A plurality of the controllers 30 may be connected to the consumer game machine 11 by wire or wireless. The input/output processing unit 20 scans an operation state of the controller 30 at fixed intervals (for example, every $1/60^{th}$ of a second), and then transfers an operation signal indicating a result of the scanning to the control unit 14 via the bus 12. The control unit 14 makes judgment on the user's game operation based on the operation signal.

On the game device 10, for example, a soccer game simulating a soccer match is executed. The soccer game is implemented by executing a game program read from the optical disk 36. Hereinafter, the soccer game is described.

First, a user who plays the soccer game selects any one of a plurality of teams prepared in advance as a team of an operation subject. After that, a match is started between a team selected by the user (hereinafter, referred to as "user team") and a team operated by an opponent (computer or another user) (hereinafter, referred to as "opponent team"). As in the case of an actual soccer match, in principle, the length of the match is 90 minutes (45 minutes for the first half and the second half, respectively). It should be noted that this time length (90 minutes) is in-game time. For example, the in-game time is set such that 45 minutes of in-game time corresponds to 10 minutes of actual time.

Figure 2:
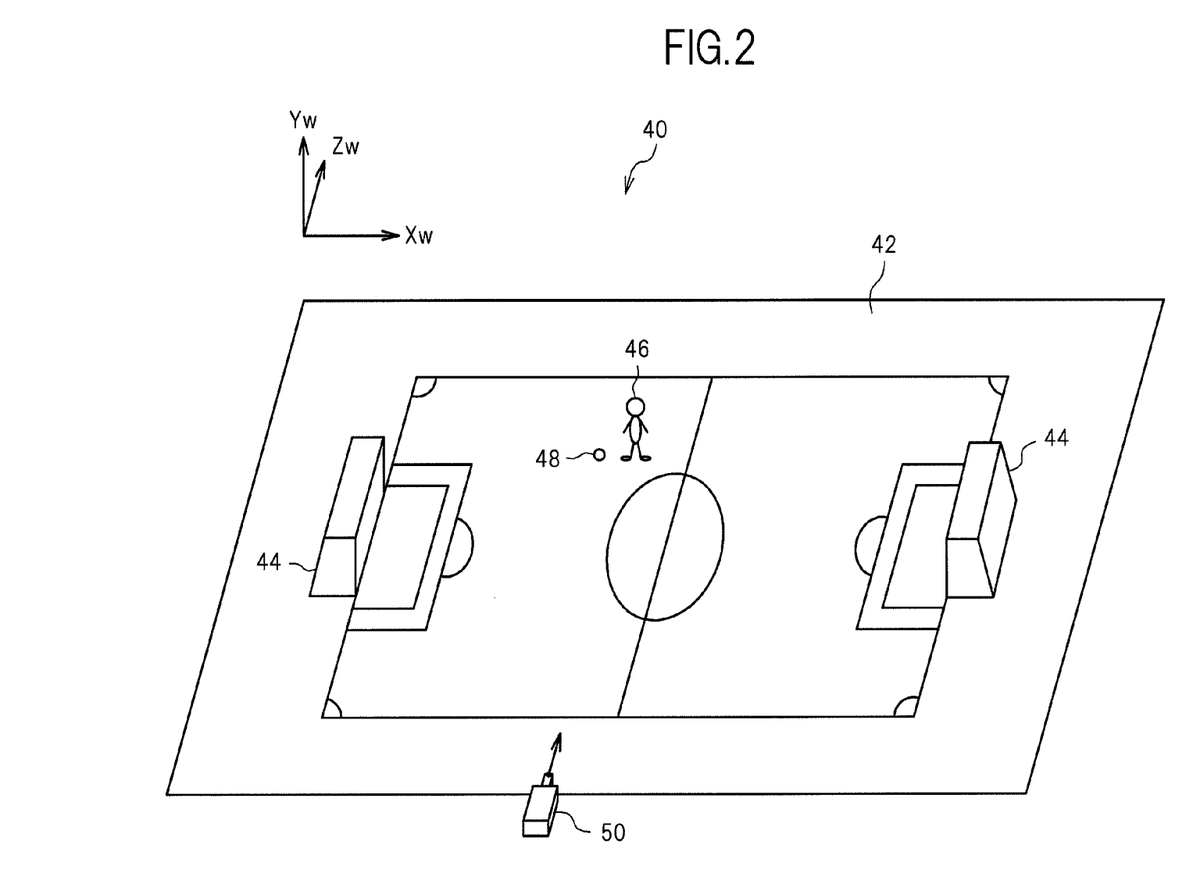
FIG. 2 is a diagram illustrating an example of a game space.

A game space is built in the main memory 16 to display the game screen. FIG. 2 illustrates an example of the game space. A game space 40 illustrated in FIG. 2 is a virtual three-dimensional space. As illustrated in FIG. 2, a field 42, which is an object representing a soccer field, is located in the game space 40. Goals 44, which are objects representing soccer goals, a player character 46, which is an object representing a soccer player, and a ball 48, which is an object representing a soccer ball, are located on the field 42. It should be noted that eleven player characters 46 belonging to the user team and eleven player characters 46 belonging to the opponent team are located on the field 42, but illustration thereof is omitted in FIG. 2.

One of the goals 44 is associated with the user team, whereas the other of the goals 44 is associated with the opponent team. If the ball 48 moves into the goal 44 associated with any one of the teams, a scoring event occurs for the other of the teams.

In addition, a virtual camera 50 (viewpoint) is set in the game space 40. The game screen showing a situation of the game space 40, which is viewed from the virtual camera 50, is displayed on the display unit 32 (see FIG. 4 described later). For example, in order to constantly display the ball 48 on the game screen, the virtual camera 50 moves around within the game space 40 according to the position of the ball 48.

In this soccer game, a target which the user needs to achieve in the match is presented, and the user aims to achieve that target. For example, the user is given any one of the targets described below. The targets described below are such targets that include numerical targets regarding the number of shots, the distance of a shot, or a score difference. The targets are:
(1) to win the match with the number of shots being 18 or more;
(2) to win the match with the number of shots being 12 or less;
(3) to win the match by making more shots than the opponent team by 5 or more;
(4) to win the match by scoring with a shot from 25 meters or longer;
(5) to keep a state in which the score difference against the opponent is +2 or larger until the match is ended; and
(6) to make the score difference against the opponent +3 or larger.

Here, in the targets (5) and (6) described above, the "score difference against the opponent" is a score difference obtained by subtracting the score of the opponent team from the score of the user team. For example, a state in which the score difference against the opponent is +1 is a state in which the score of the user team is higher than the score of the opponent team by 1. Further, in a case where the target (5) described above is given to the user, the game is started from the middle of the match. For example, the game is started in a situation where the match is in the middle of the second half and the score of the user team is higher than the score of the opponent team by 2.

Figure 3:
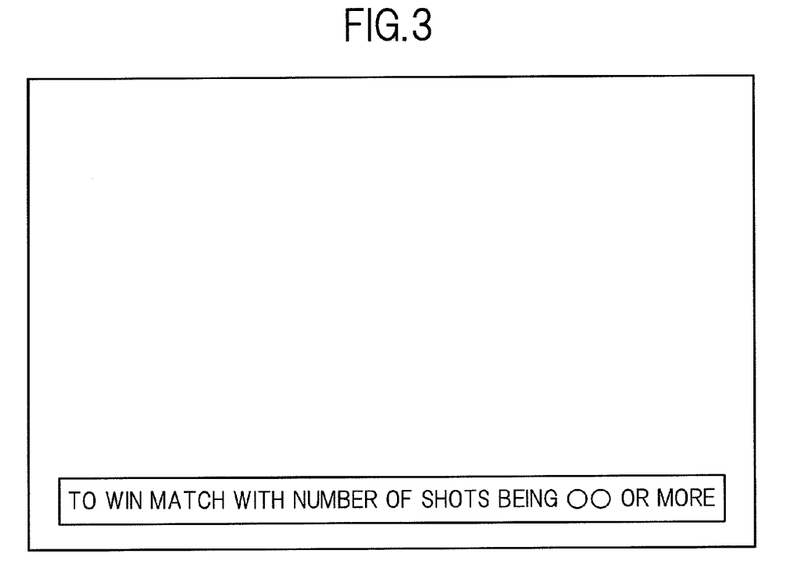
FIG. 3 is a diagram illustrating an example of a game screen.

The target which the user needs to achieve is presented to the user as described below. Specifically, first, before the match is started (or when the match is started or immediately after the match is started), only a part of the content of the target is presented to the user. FIG. 3 illustrates an example of the game screen in this case. In the game screen illustrated in FIG. 3, only a part of the content of the target is displayed excluding a numerical value part, and hence the numerical value part is not displayed. Because the whole of the content of the target is not displayed on the game screen illustrated in FIG. 3, the user can know that the target which needs to be achieved in the match is a target relevant to the number of shots, but cannot know how many shots the user needs to make.

Figure 4:
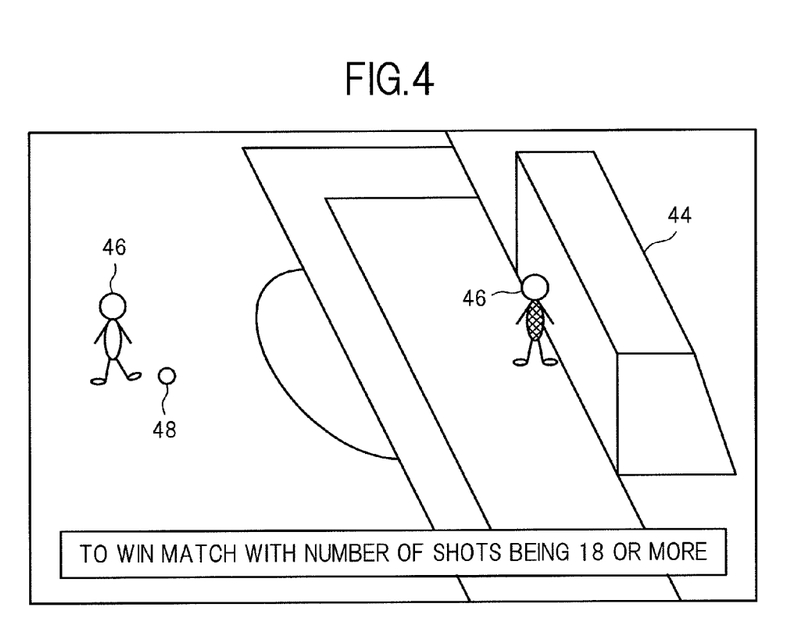
FIG. 4 is a diagram illustrating another example of the game screen.

The whole of the content of the target is presented to the user at a given time after the match is started. FIG. 4 illustrates an example of the game screen in this case. In the game screen illustrated in FIG. 4, the numerical value part of the content of the target is also displayed, and thus the whole of the content of the target is displayed. At a point when the game screen illustrated in FIG. 4 is displayed, the user can know that the user needs to make 18 or more shots in the match.

The time at which the whole of the content of the target is presented to the user is advanced or delayed depending on whether or not a possibility of the user achieving the target is high.

For example, in the case of a user who has a high possibility of achieving the target (for example, a highly skilled user), the whole of the content of the target is presented at a relatively late time (for example, a late stage of the match). In this case, the user plays the game in the state of not being able to know the whole of the content of the target until a relatively late time, and hence the user plays the game with a feeling of tension (feeling of tension about whether or not the target can be achieved) maintained. In other words, it is possible to prevent a decrease in feeling of tension (feeling of tension about whether or not the target can be achieved) to be experienced by the user.

On the other hand, in the case of a user having a low possibility of achieving the target (for example, poorly skilled user), the whole of the content of the target is presented at a relatively early time (for example, an early stage of the match). In this case, the user plays the game in the state of knowing the whole of the content of the target at a relatively early time. As a result, there is provided a configuration which prevents the degree of difficulty of achieving the target from becoming too high for the user who has a low possibility of achieving the target.

When the match is ended, it is judged whether or not the user has achieved the target, and a result of the judgment is output. Further, in a case where the user has achieved the target, the user can proceed to a match against the next team.

Figure 5:
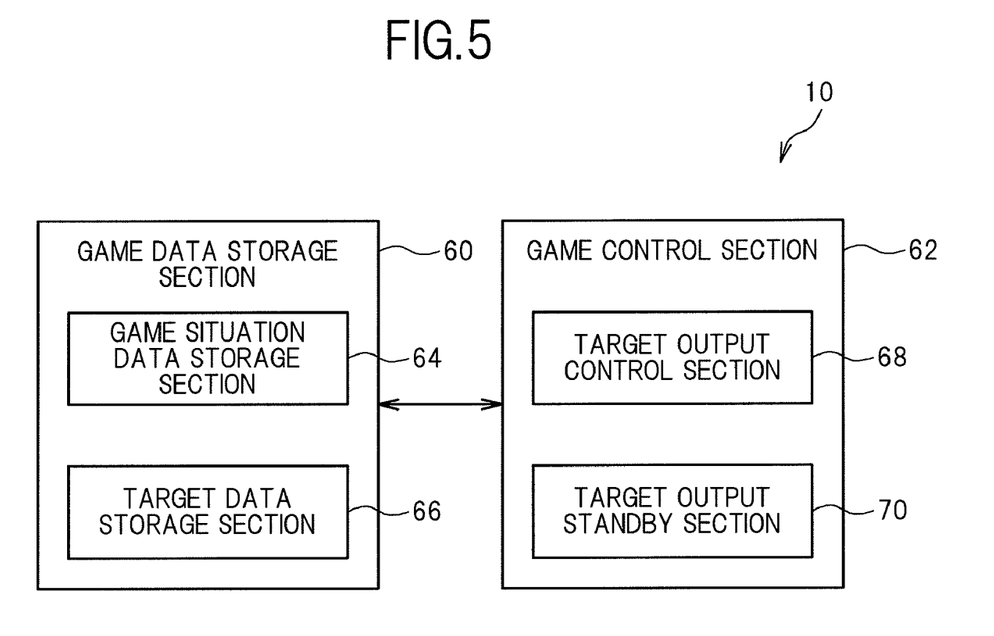
FIG. 5 is a functional block diagram illustrating an example of functional blocks implemented in the game device.

Hereinafter, description is given of a configuration regarding the target feature described above. FIG. 5 is a functional block diagram illustrating an example of functional blocks implemented by the game device 10. The functional block diagram illustrated in FIG. 5 mainly illustrates functional blocks relevant to the target outputting feature described above. As illustrated in FIG. 5, the game device 10 includes a game data storage section 60 and a game control section 62. The game data storage section 60 is mainly implemented by, for example, the main memory 16 and the optical disk 36. The game control section 62 is mainly implemented by, for example, the control unit 14.

The game data storage section 60 includes a game situation data storage section 64. The game situation data storage section 64 stores game situation data indicating a current situation of the game. For example, the following data is stored as the game situation data:
(1) data indicating the current state (for example, position, orientation, posture, action type, etc.) of each player character 46;
(2) data indicating the current state (for example, position, moving direction, etc.) of the ball 48;
(3) data indicating the current state (for example, position, direction of sight, etc.) of the virtual camera 50;
(4) data indicating a game result; and
(5) data indicating an elapsed time.

Here, the "data indicating a game result" is data indicating a result of the game at a current time point (interim result). For example, the "data indicating a game result" includes, for both the teams, data indicating the score and the number of shots, and data indicating the distance of a scoring shot.

Further, the game data storage section 60 includes a target data storage section 66. The target data storage section 66 stores data regarding the target which the user needs to achieve in the game.

Figure 6:
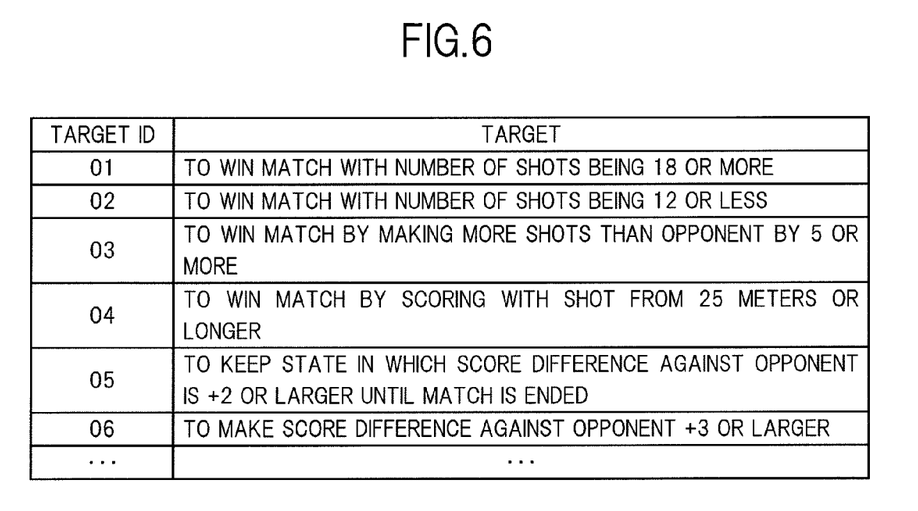
FIG. 6 is a diagram illustrating an example of target list data.

FIG. 6 illustrates target list data stored in the target data storage section 66. The target list data is data indicating a list of targets. The target list data illustrated in FIG. 6 contains fields of "target ID" and "target". The "target ID" field indicates identification information for uniquely identifying the target. The "target" field indicates a content of the target. The targets stored in the target list data illustrated in FIG. 6 are such targets that include a numerical target regarding, for example, the number of shots (number of times a predetermined action has been made), the distance of a shot (distance regarding a predetermined action), or the number of times the scoring event (predetermined game event) has occurred.

Figure 7:
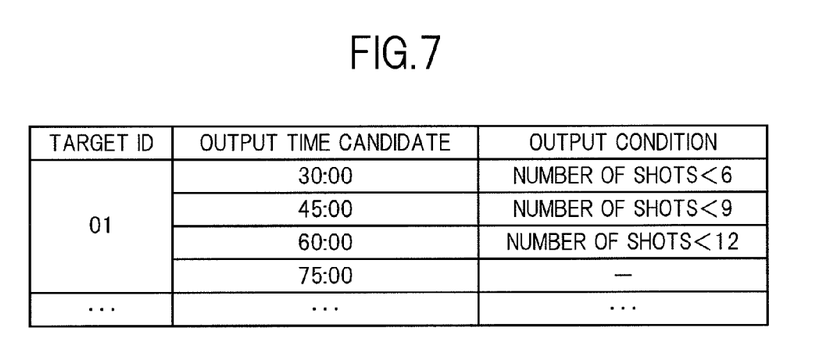
FIG. 7 is a diagram illustrating an example of target output control data.

FIG. 7 illustrates target output control data stored in the target data storage section 66. The target output control data is data for controlling an output of the target. The target output control data illustrated in FIG. 7 contains fields of "target ID", "output time candidate", and "output condition". The "target ID" field is the same as in the target list data (see FIG. 6).

The "output time candidate" field indicates a candidate for a time at which the whole of the content of the target is output (hereinafter, referred to as "output time candidate"). In the example illustrated in FIG. 7, the output time candidate is indicated by the elapsed time after the match is started. Here, for example, "30:00" indicates that a time at which the elapsed time reaches 30 minutes is the output time candidate.

The "output condition" field indicates a condition (output condition) which needs to be satisfied for outputting the whole of the content of the target. The output condition is a condition (achievement status condition) regarding an achievement status for the target. It should be noted that the "achievement status for the target" means the extent to which the target has been achieved, and hence can be rephrased as the degree of achievement for the target. For example, an output condition of "number of shots<6" for a target of "to win the match with the number of shots being 18 or more" which has a target ID of "01" corresponds to a condition of "whether or not the degree of achievement for the target is lower than ⅓". Further, "-" indicates that the whole of the content of the target is output unconditionally.

The target output control data described above is set such that, in a case where the user has a relatively high possibility of achieving the target, the output time of the whole of the content of the target becomes relatively late. In other words, the target output control data is set such that, in a case where the user has a relatively low possibility of achieving the target, the output time of the whole of the content of the target becomes relatively early.

The game control section 62 executes control regarding the game. The game control section 62 includes a target output control section 68 and a target output standby section 70.

The target output control section 68 causes the target which the user needs to achieve in the game to be output. The "output" includes, for example, displaying an image indicating the target on the display unit 32, outputting audio which notifies the target from the audio outputting unit 34, and the like. Further, the target output standby section 70 holds the output of the target by the target output control section 68 on standby based on the achievement status for the target.

In the case of this embodiment, first, the target output control section 68 causes a part of the content of the target to be output (see FIG. 3). It should be noted that the target of this embodiment is a target which includes a numerical target, and the "part of the content of the target" is a part other than the numerical value part. Further, after the above-mentioned part of the content of the target is output, the target output control section 68 causes the whole of the content of the target to be output (see FIG. 4).

Further, in the case of this embodiment, the target output standby section 70 holds the output of the whole of the content of the target on standby until the output time which is a time after the game has started and is determined based on the achievement status for the target. As described later, the target output standby section 70 judges, at each predetermined output time candidate, whether or not the achievement status for the target satisfies a predetermined condition regarding the achievement status for the target (hereinafter, referred to as "achievement status condition"). Then, in a case where the achievement status for the target satisfies the achievement status condition, the standby is canceled, and the target output standby section 70 allows the target output control section 68 to output the whole of the content of the target.

It should be noted that a part of the content of the target (a part other than the numerical value part) is output at predetermined fixed times, and hence the target output standby section 70 may also be regarded to control the length of a period from the output of the part of the content of the target until the output of the whole of the content of the target.

The game control section 62 judges whether or not the target has been achieved based on the user's game result, and then causes the judgment result to be output. For example, the game control section 62 displays a screen showing the judgment result on the display unit 32, or outputs audio notifying the judgment result from the audio outputting unit 34. Further, the game control section 62 controls the progression of the game based on the above-mentioned judgment result. For example, in a case where it is judged that the target has been achieved, the game control section 62 allows the user to proceed to the next stage (match against the next team).

Figure 8:
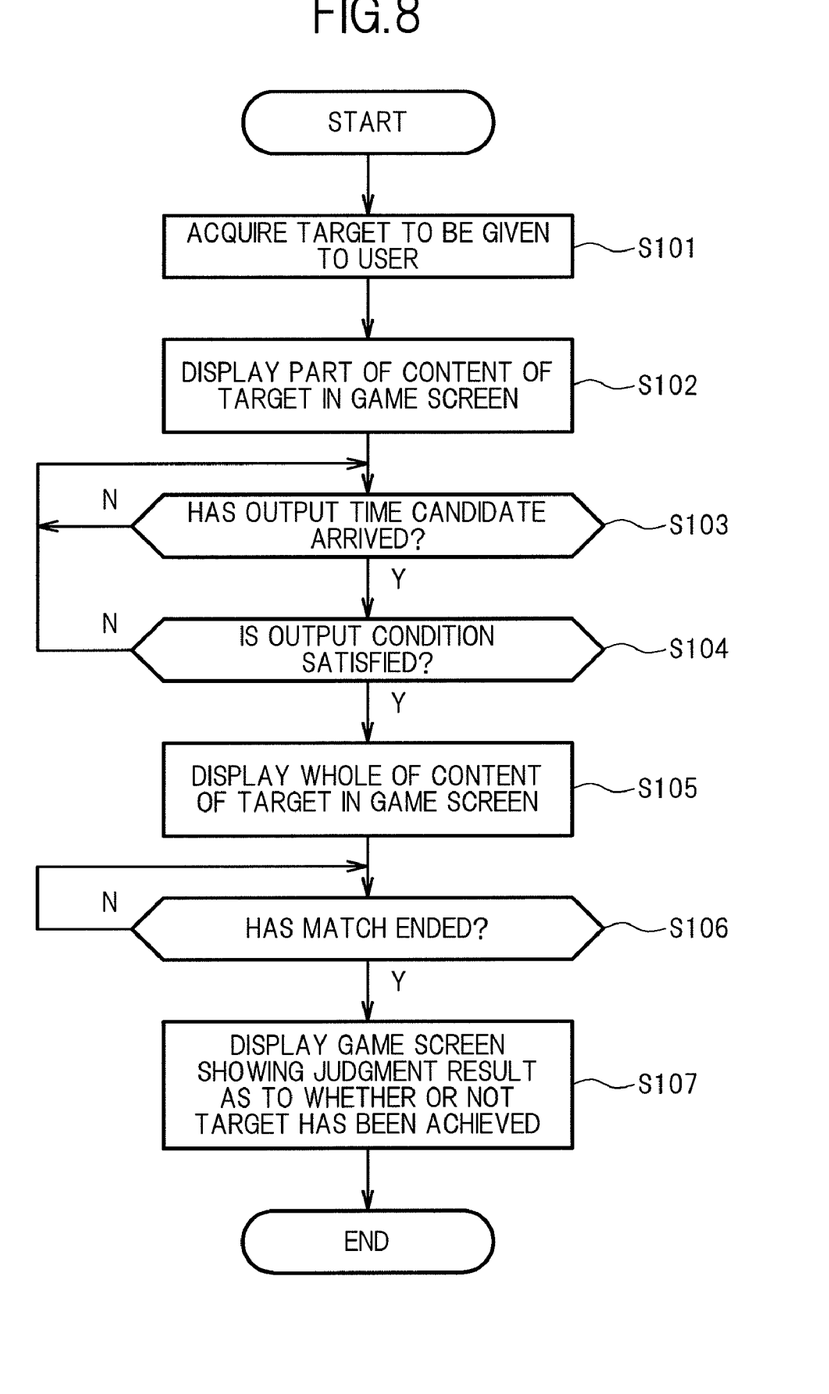
FIG. 8 is a flow chart illustrating an example of processing to be executed by the game device.

Here, description is given of processing to be executed by the game device 10 to implement the game control section 62. FIG. 8 is a flow chart illustrating processing to be executed in a case where a match is started between the user team and the opponent team. The flow chart illustrated in FIG. 8 mainly illustrates processing relevant to the output of the target. The control unit 14 executes the processing illustrated in FIG. 8 according to the program read from the optical disk 36.

As illustrated in FIG. 8, the control unit 14 first acquires a target to be given to the user in the match between the user team and the opponent team (S101). For example, the control unit 14 acquires a target corresponding to the opponent team from among a plurality of targets stored in the target list data (see FIG. 6). Alternatively, the control unit 14 may select any one of the plurality of targets stored in the target list data (see FIG. 6) based on a random number.

After that, the control unit 14 (target output control section 68) displays a part (a part other than the numerical value part) of the content of the target acquired in Step S101 on the game screen (S102). Specifically, the control unit 14 displays a game screen such as illustrated in FIG. 3, for example. After the processing of Step S102 is executed, the match is started, and also, processing described below (S103 to S106) is executed. The processing described below (S103 to S106) is executed in parallel with "processing of updating the states of the player characters 46, the ball 48, and the virtual camera 50, and updating the game screen".

After that, the control unit 14 (target output standby section 70) monitors whether or not the output time candidate has arrived (S103). Whether or not the output time candidate has arrived is judged based on the target output control data (see FIG. 7) and the game situation data. In a case where it is judged that the output time candidate has not arrived, the control unit 14 (target output standby section 70) continues to monitor whether or not the output time candidate has arrived (S103). In this case, a state in which the whole of the content of the target is not presented to the user yet continues.

On the other hand, in a case where it is judged that the output time candidate has arrived, the control unit 14 (target output standby section 70) refers to the target output control data (see FIG. 7), and reads an output condition (achievement status condition) associated with that output time candidate. Then, the control unit 14 (target output standby section 70) judges whether or not the achievement status for the target at the current time point satisfies the read output condition based on the interim result of the game at the current time point (S104).

In a case where it is judged that the output condition is not satisfied, the control unit 14 (target output standby section 70) continues to monitor whether or not the output time candidate has arrived (S103). In this case, the state in which the whole of the content of the target is not presented to the user yet continues. On the other hand, in a case where it is judged that the output condition is satisfied, the control unit 14 (target output control section 68) displays the whole of the content of the target acquired in Step S101 on the game screen (S105). Specifically, the control unit 14 displays such a game screen as illustrated in FIG. 4, for example.

After that, the control unit 14 (game control section 62) monitors whether or not the match has been ended (S106). In a case where the match has ended, the control unit 14 (game control section 62) judges whether or not the target has been achieved, and then displays the game screen showing the judgment result (S107). With the above, this processing is ended.

In the game device 10 described above, the output of the whole of the content of the target which the user needs to achieve in the match is delayed based on the achievement status for the target in the match. For example, in the case where the user has a high possibility of achieving the target, the whole of the content of the target is output at a relatively late time. As a result, the user who has a high possibility of achieving the target plays the game in the state of not being able to know the whole of the content of the target until at a relatively late time, and hence the user plays the game with a feeling of tension (feeling of tension about whether or not the target can be achieved) maintained. With the game device 10, the feeling of tension (feeling of tension about whether or not the target can be achieved) to be experienced by the user can be prevented from decreasing to maintain the feeling of tension to be experienced by the user.

It should be noted that the present invention is not limited to the embodiment described above.

(1) For example, the processing of Step S102 of FIG. 8 may be omitted. In other words, the game screen as illustrated in FIG. 3 may not be displayed. Specifically, instead of outputting apart (part other than the numerical value part) of the content of the target before the whole of the content of the target is output, the whole of the content of the target may be output directly.

(2) Further, for example, on the game screen illustrated in FIG. 3, a part of "or more" of the content of the target may be omitted from display as well. In this case, for example, the user plays the game in the state of not being able to know whether the target which the user needs to achieve is a target having a target ID of "01" (see FIG. 6) or a target having a target ID of "02" (see FIG. 6). As a result, it is possible to increase the feeling of tension to be experienced by the user.

Further, for example, on the game screen illustrated in FIG. 3, the numerical value part ("18") of the content of the target may be displayed, and the part of "or more" of the content of the target may not be displayed. In this case, the user plays the game in the state of not being able to know whether the target which the user needs to achieve is the target of "to win the match with the number of shots being 18 or more" or the target of "to win the match with the number of shots being 18 or less". Even with this configuration, it is possible to increase the feeling of tension to be experienced by the user.

(3) Further, for example, the content of the target may be further divided into a plurality of parts, and those plurality of parts may be displayed one by one. For example, on the game screen illustrated in FIG. 3, both the part of "18" (numerical value part) and the part of "or more" of the content of the target may not be displayed. Then, in a case where the output condition is satisfied at any one of the output time candidates, one of the part of "18" (numerical value part) and the part of "or more" may be displayed first on the game screen. Further, in a case where the output condition is satisfied at a subsequent output time candidate, the other part may be displayed on the game screen.

(4) Further, for example, in the example illustrated in FIG. 7, the output time candidate is a predetermined time, but the output time candidate may not be a predetermined time. For example, the output time candidate may be a time at which a predetermined game event occurs. Here, the "predetermined game event" is, for example, the scoring event.

Further, in a case where the target which the user needs to achieve is the target of "to make the score difference against the opponent +3 or larger" (see FIG. 6), the output time candidate may be set as a time at which the scoring event of the opponent team occurs. Further, the output condition (see FIG. 7) for this output time candidate may be a condition of, for example, "the score of the user team is lower than the score of the opponent team".

A state in which the scoring event of the opponent team has occurred and the score of the user team is lower than the score of the opponent team is a state in which the possibility of achieving the above-mentioned target has become lower. In this regard, if the output time candidate and the output condition are set as described above, the whole of the content of the target is output in the case where the possibility of achieving the target has become lower. In other words, in a case where the possibility of achieving the target has not become lower, the output of the whole of the content of the target is held on standby. As a result, the feeling of tension (feeling of tension about whether or not the target can be achieved) to be experienced by the user is maintained.

It should be noted that in the case where the target which the user needs to achieve is the target of "to make the score difference against the opponent +3 or larger" (see FIG. 6), a time at which the scoring event of the user team occurs in the late stage of the match may also be set as the output time candidate. Further, the output condition at this output time candidate (see FIG. 7) may be set as a condition of, for example, "the score of the user team is higher than the score of the opponent team by 2". With this configuration, the whole of the content of the target is output in a case where the user is likely to achieve the target in the late stage of the match.

(5) Further, for example, the game space 40 may be a virtual two-dimensional space. Specifically, the positions, postures, moving directions, etc. of the player characters and the ball may be managed using two coordinate elements.

(6) Further, for example, the present invention is also applicable to sports games other than the soccer game. For example, the present invention is also applicable to a basketball game, an American football game, a rugby game, a baseball game, or a tennis game, which are played using a ball (moving object), or an ice hockey game that is played using a puck (moving object). Further, the present invention is also applicable to games other than the sports game. For example, the present invention is applicable to an action game, a role playing game, or the like. Further, the present invention is also applicable to a network game executed via a communication network.

Figure 9:
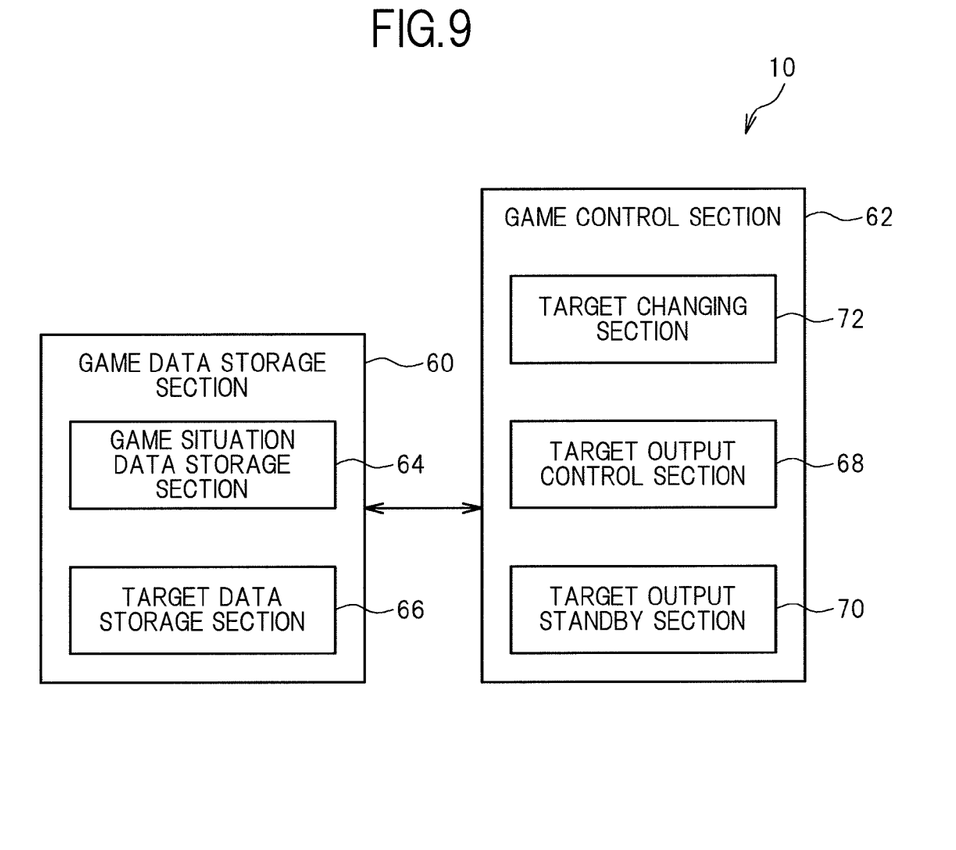
FIG. 9 is a functional block diagram illustrating another example of the functional blocks implemented in the game device.

(7) Further, for example, the game device 10 may include a target changing section for changing the target which the user needs to achieve in the game (match). FIG. 9 illustrates a functional block diagram for this case. The functional block diagram illustrated in FIG. 9 is different from the functional block diagram illustrated in FIG. 5 in that a target changing section 72 is included in the game device 10. Hereinafter, description of the target changing section 72 is given.

(7-1) For example, the target changing section 72 (a first target changing section) changes the target based on a combination of the user team (first game character group) and the opponent team (second game character group). More specifically, the target changing section 72 changes the target based on relative strength between the user team and the opponent team. For example, in a case where the opponent team is stronger than the user team, the target changing section 72 changes the target so that the degree of difficulty decreases compared to a case where the opponent team is not stronger than the user team. Further, for example, in a case where the opponent team is weaker than the user team, the target changing section 72 changes the target so that the degree of difficulty increases compared to a case where the opponent team is not weaker than the user team.

Figure 10:
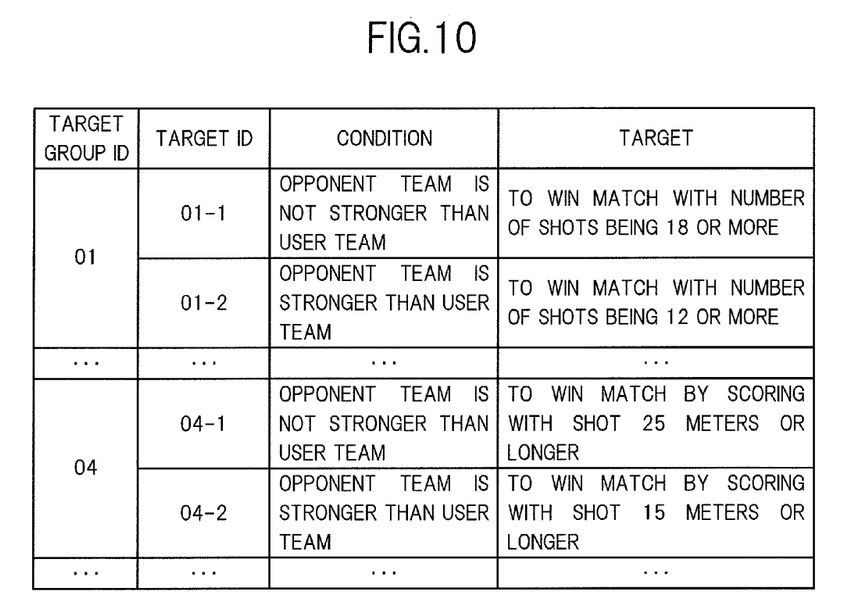
FIG. 10 is a diagram illustrating another example of the target list data.

In this modification example, for example, target list data illustrated in FIG. 10 is stored in the target data storage section 66 instead of the target list data illustrated in FIG. 6. The target list data illustrated in FIG. 10 contains fields of "target group ID", "target ID", "condition", and "target". The "target group ID" field is identification information for uniquely identifying a target group, and the "target ID" field is identification information for uniquely identifying the target. The "condition" field indicates a condition regarding the combination of the user team and the opponent team, more specifically, a condition regarding the relative strength between the user team and the opponent team. The "target" field indicates a content of the target.

It should be noted that in the target list data illustrated in FIG. 10, the targets belonging to the same target group differ from each other only in the numerical value parts. Further, the target in the case where the opponent team is stronger than the user team has a lower degree of difficulty compared to the target in the case where the opponent team is not stronger than the user team.

Figure 11:
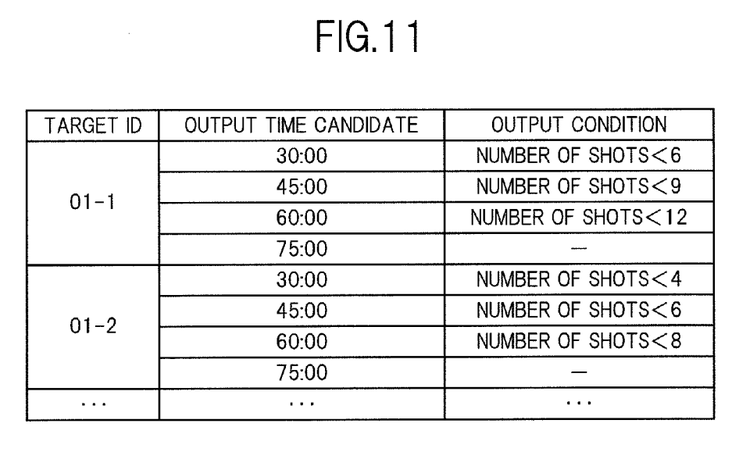
FIG. 11 is a diagram illustrating another example of the target output control data.

Further, in this modification example, for example, target output control data illustrated in FIG. 11 is stored in the target data storage section 66 instead of the target output control data illustrated in FIG. 7. Similarly to the target output control data illustrated in FIG. 7, the target output control data illustrated in FIG. 11 also contains fields of "target ID", "output time candidate", and "output condition". Those fields are the same as in the target output control data illustrated in FIG. 7.

Further, in this modification example, processing described below is executed in Step S101 of FIG. 8.

Specifically, in Step S101 of FIG. 8, first, the control unit 14 selects any one of the target groups. For example, the control unit 14 selects a target group corresponding to the opponent team from among a plurality of target groups stored in the target list data (see FIG. 10). Alternatively, the control unit 14 may select any one of the plurality of target groups stored in the target list data (see FIG. 10) based on a random number.

After that, the control unit 14 judges whether or not the opponent team is stronger than the user team. For example, the control unit 14 acquires an evaluation value of the user team. Specifically, the control unit 14 calculates a statistical value (for example, average value) of ability parameters of the player characters 46 belonging to the user team as the evaluation value of the user team. In the same manner, the control unit 14 acquires the evaluation value of the opponent team. It should be noted that the evaluation values of the user team and the opponent team may be stored in the game data storage section 60 (optical disk 36) in advance.

After the evaluation values of the user team and the opponent team are acquired, the control unit 14 judges whether or not the evaluation value of the opponent team is higher than the evaluation value of the user team. In a case where the evaluation value of the opponent team is higher than the evaluation value of the user team, the control unit 14 judges that the opponent team is stronger than the user team.

It should be noted that the game data storage section 60 (optical disk 36) may store ranking data indicating relative strengths among the plurality of teams, to thereby allow the control unit 14 to judge whether or not the opponent team is stronger than the user team based on the ranking data.

After it is judged whether or not the opponent team is stronger than the user team, the control unit 14 selects any one of the targets belonging to the selected target group based on the judgment result. For example, assume a case in which the target group ID of the selected target group is "01". In a case where it is judged that the opponent team is not stronger than the user team, a target having a target ID of "01-1" is selected. In a case where it is judged that the opponent team is stronger than the user team, a target having a target ID of "01-2" is selected.

Further, in this modification example, in Steps S103 and S104 of FIG. 8, the processing is executed using the target output control data illustrated in FIG. 11 instead of the target output control data illustrated in FIG. 7.

According to this modification example, as described below, it becomes possible to reduce an increase in degree of difficulty of the target which is caused by the combination of the user team and the opponent team. The degree of difficulty of the target varies depending on the combination of the user team and the opponent team. For example, in the case where the opponent team is stronger than the user team, the target becomes more difficult for the user to achieve, compared to the case where the opponent team is not stronger than the user team. In this regard, in this modification example, the target is changed based on the combination of the user team and the opponent team. According to this modification example, it becomes possible to reduce an increase in degree of difficulty of the target which is caused by the combination of the user team and the opponent team.

It should be noted that in a tennis game, for example, in the case of a game configured such that a game character operated by the user plays a match against a game character operated by the opponent (computer or another user), the target changing section 72 changes the target based on the combination of the game character (first game character) operated by the user and the game character (second game character) operated by the opponent. Specifically, the target changing section 72 changes the target based on the relative strength between the game character operated by the user and the game character operated by the opponent.

(7-2) Further, for example, the target changing section 72 (a second target changing section) changes the target based on the achievement status for the target after the game (match) has started.

(7-2-1) For example, the target changing section 72 changes the degree of difficulty of the target based on the achievement status for the target at a given time after the game (match) has started. More specifically, in a case where the degree of achievement for the target is low at the given time after the game (match) has started, the target changing section 72 changes the target so that the degree of difficulty decreases. On the other hand, in a case where the degree of achievement for the target is high at the given time after the game (match) has started, the target changing section 72 changes the target so that the degree of difficulty increases.

Figure 12:
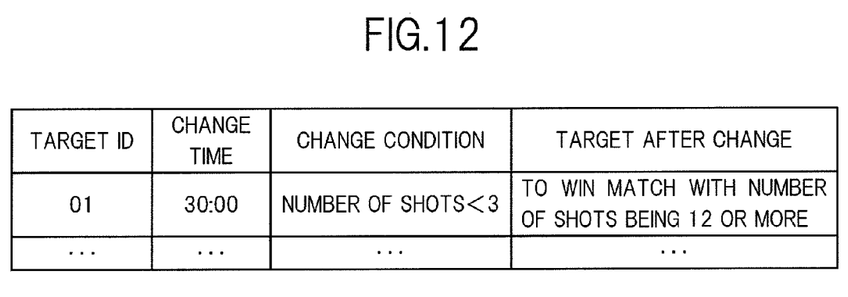
FIG. 12 is a diagram illustrating an example of target change control data.

In this modification example, target change control data illustrated in FIG. 12, for example, is stored in the target data storage section 66. The target change control data illustrated in FIG. 12 contains fields of "target ID", "change time", "change condition", and "target after change". The "target ID" field is the same as in the target list data illustrated in FIG. 6. The "change time" field indicates a time at which it is judged whether or not to change the target (in other words, a time of changing the target). The "change condition" field indicates a condition (change condition) which needs to be satisfied for changing the target. The change condition is a condition (achievement status condition) regarding the achievement status for the target. The "target after change" field indicates a content of the target after change.

It should be noted that in the target change control data illustrated in FIG. 12, the change condition is a condition for determining whether or not the degree of achievement for the target is low. Further, the target after change is a target having a lower degree of difficulty compared to the original target.

Figure 13:
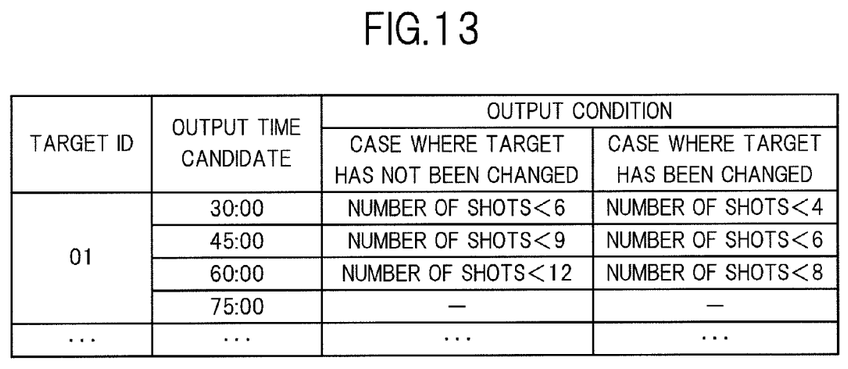
FIG. 13 is a diagram illustrating another example of the target output control data.

Further, in this modification example, target output control data illustrated in FIG. 13, for example, is stored in the target data storage section 66 instead of the target output control data illustrated in FIG. 7. Similarly to the target output control data illustrated in FIG. 7, the target output control data illustrated in FIG. 13 contains fields of "target ID", "output time candidate", and "output condition" as well. The "target ID" field and the "output time candidate" field are the same as in the target output control data illustrated in FIG. 7. The "output condition" field indicates an output condition for a case where the target has not been changed and an output condition for a case where the target has been changed.

Figure 14:
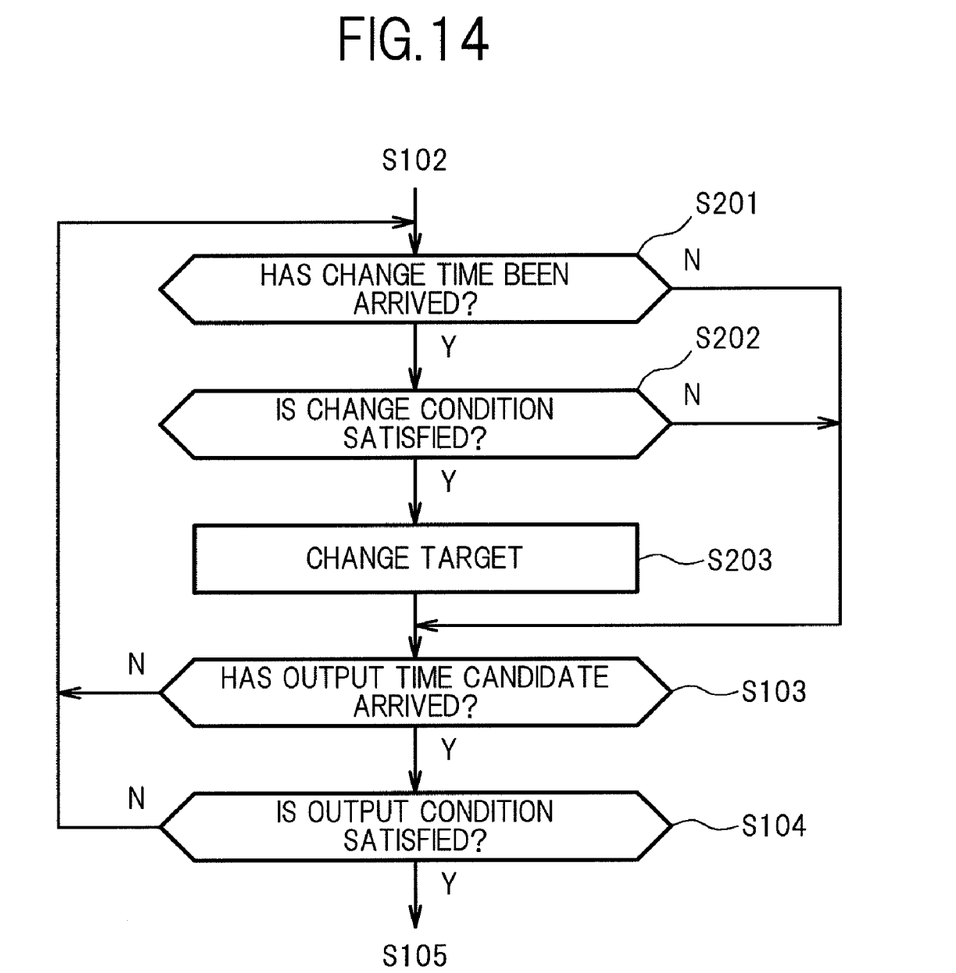
FIG. 14 is a flow chart illustrating another example of the processing to be executed by the game device.

Further, in this modification example, processing from Steps S201 to S203 illustrated in FIG. 14 is executed between the processing of Step S102 and the processing of Step S103 of FIG. 8.

Specifically, after the processing of Step S102 is executed, the control unit 14 judges whether or not the change time has arrived (S201). Whether or not the change time has arrived is judged based on the target change control data (see FIG. 12) and the game situation data.

In a case where it is judged that the change time has arrived, the control unit 14 refers to the target change control data (see FIG. 12), and reads the change condition corresponding to that change time. Then, the control unit 14 judges whether or not the achievement status for the target at the current time point satisfies the read change condition based on the interim result of the game at the current time point (S202). In a case where it is judged that the change condition is satisfied, the control unit 14 changes the target based on the target change control data (see FIG. 12) (S203).

The control unit 14 judges whether or not the output time candidate has arrived in a case where it is judged in Step S201 that the change time has not arrived, in a case where it is judged in Step S202 that the change condition is not satisfied, or in a case where the target has been changed in Step S203 (S103). This processing is the same as in Step S103 of FIG. 8.

In a case where it is judged that the output time candidate has arrived, the control unit 14 refers to the target output control data (see FIG. 13), and reads the output condition corresponding to that output time candidate. In a case where the processing of Step S203 has not been executed (that is, in a case where the target has not been changed), the output condition for the case where the target has not been changed is read. On the other hand, in a case where the processing of Step S203 has been executed (that is, in a case where the target has been changed), the output condition for the case where the target has been changed is read. Then, the control unit 14 judges whether or not the achievement status for the target at the current time point satisfies the read output condition based on the interim result of the game at the current time point (S104). This processing is the same as in Step S104 of FIG. 8.

In a case where it is judged that the output condition is not satisfied, the control unit 14 executes the processing of Step S201 again. On the other hand, in a case where it is judged that the output condition is satisfied, the control unit 14 displays the whole of the content of the target (S105). In the case where the processing of Step S203 has not been executed (that is, in a case where the target has not been changed), the whole of the content of the original target is displayed. On the other hand, in the case where the processing of Step S203 has been executed (that is, in a case where the target has been changed), the whole of the content of the target after change is displayed.

In this modification example, the target which the user needs to achieve in the game (match) is changed based on the achievement status of the user for the target in the game (match). Specifically, in a case where the degree of achievement for the target is low at a time at which the elapsed time becomes "30:00", the target is changed so that the degree of difficulty decreases. In the case where the degree of achievement for the target is low, the user may give up achieving the target, and the feeling of tension (feeling of tension about whether or not the target can be achieved) to be experienced by the user may decrease. In this regard, according to this modification example, the target is changed according to the achievement status (degree of achievement) for the target, and hence it is possible to prevent the above-mentioned decrease in feeling of tension to be experienced by the user.

(7-2-2) It should be noted that in the modification example (7-2-1) described above, the target changing section 72 changes the degree of difficulty of the target, but the target changing section 72 may change a deadline for achieving the target.

Specifically, the target changing section 72 may change the deadline for achieving the target based on the achievement status for the target at a given time after the game (match) has started. More specifically, in a case where the degree of achievement for the target is high at the given time after the game (match) has started, the target changing section 72 may change the target so that the achievement deadline comes earlier. Alternatively, in a case where the degree of achievement for the target is low at the given time after the game (match) has started, the target changing section 72 may change the target so that the achievement deadline comes later.

Hereinafter, description is given taking as an example a case where the target which the user needs to achieve is the target of "to make the score difference against the opponent +3 or larger" (see FIG. 6).

In this example, when the match is started, for example, the target of "to make the score difference against the opponent +3 points or larger" is presented to the user. In this case, the user understands that the target which the user needs to achieve is "to make the score difference against the opponent +3 or larger by the time the match is ended (when the second half is ended)".

Further, in this example, a time at which the elapsed time becomes "20:00" or the like is set as the change time for the target. Similarly to the above-mentioned modification example (7-2-1: see FIG. 12), the "change time" is a time for judging whether or not to change the target (in other words, time of changing the target).

Then, in a case where the change time has arrived (for example, in a case where the elapsed time has become "20:

00"), a judgment for a change condition regarding "whether or not the score of the user team is higher than the score of the opponent team by 2" is made. Similarly to the above-mentioned modification example (7-2-1: see FIG. 12), the "change condition" is a condition which needs to be satisfied for changing the target, and more specifically, a condition regarding the achievement status for the target.

Then, in a case where it is judged that the score of the user team is higher than the score of the opponent team by 2, the target which the user needs to achieve is changed to a target of "to make the score difference against the opponent +3 or larger when the first half is ended". Specifically, the deadline by which time the user needs to achieve the target is set to "when the first half is ended" instead of "when the match is ended (when the second half is ended)". Then, the target after change is presented to the user. Specifically, the whole of the content of the target is presented to the user.

In this modification example, in a case where the degree of achievement for the target is high at the time at which the elapsed time becomes "20:00", the target is changed so that the achievement deadline comes earlier. As a result, it is possible to give a feeling of tension (feeling of tension about whether or not the target can be achieved) to, for example, a highly skilled user or a user who is using a team with a high scoring ability as the user team.

Incidentally, the target changing section 72 of this modification example may be regarded to add a new target (for example, "when the first half is ended") to the original target (for example, "to make the score difference against the opponent +3 or larger").

(7-3) Further, the modification examples (7-1) and (7-2) described above may be combined.

(8) While there have been described what are at present considered to be certain embodiments of the invention, it will be understood that various modifications may be made thereto, and it is intended that the appended claims cover all such modifications as fall within the true spirit and scope of the invention.

What is claimed is:

1. A game device for executing a game, comprising:
a target output control section for causing, after the game has started, a target which a user needs to achieve in the game to be output, the target output control section comprising,
a section for causing a part of a content of the target to be output; and
a section for causing the whole of the content of the target to be output after the part of the content of the target is output and the game has started; and
a target output standby section for holding the output of the target by the target output control section on standby based on an achievement status of the player for the target,
wherein the target output standby section holds the output of the whole of the content of the target on standby during the play of the game, based on the achievement status of the player for the target.

2. The game device according to claim 1, wherein the target output standby section comprises:
a section for acquiring content stored in a storage storing an achievement status condition in association with each of a plurality of output time candidates, the achievement status condition being a condition regarding the achievement status for the target;
a section for judging, in a case where any one of the plurality of output time candidates has arrived, whether or not the achievement status for the target at the output time candidate satisfies the achievement status condition associated with the output time candidate; and
a section for allowing, in a case where it is judged that the achievement status for the target satisfies the achievement status condition, the target output control section to output the target.

3. The game device according to claim 1, wherein:
the game comprises a game played between one of a first game character and a first game character group, and one of a second game character and a second game character group, the first game character and the first game character group each being an operation subject of the user, the second game character and the second game character group each being an operation subject of one of another user and a computer; and
the game device further comprises a first target changing section for changing the target based on a combination of the one of the first game character and the first game character group, and the one of the second game character and the second game character group.

4. The game device according to claim 1, further comprising a second target changing section for changing the target based on the achievement status for the target after the game has started.

5. A method of controlling a game device comprising a processor and a storage device including computer-readable instructions for executing a game, the method comprising:
a target output control step of causing, by the processor, after the game has started, a target which a user needs to achieve in the game to be output, the target output control step comprising,
causing a part of a content of the target to be output; and
causing the whole of the content of the target to be output after the part of the content of the target is output and the game has started; and
a target output standby step of holding, by the processor, the output of the target by the target output control step on standby based on an achievement status of the player for the target
wherein the target output standby step comprises holding the output of the whole of the content of the target on standby during the play of the game, based on the achievement status of the player for the target.

6. The method of claim 5, wherein the target output standby step comprises:
acquiring content stored in a storage storing an achievement status condition in association with each of a plurality of output time candidates, the achievement status condition being a condition regarding the achievement status for the target;
judging, in a case where any one of the plurality of output time candidates has arrived, whether or not the achievement status for the target at the output time candidate satisfies the achievement status condition associated with the output time candidate; and
allowing, in a case where it is judged that the achievement status for the target satisfies the achievement status condition, the target output control step to output the target.

7. The method of claim 5, wherein:
the game comprises a game played between one of a first game character and a first game character group, and one of a second game character and a second game character group, the first game character and the first game character group each being an operation subject of the user, the second game character and the second game character group each being an operation subject of one of another user and a computer; and the game device changes the target based on a combination of the one of the first game character and the first game character group, and the one of the second game character and the second game character group.

8. The method of claim 5, further comprising changing the target based on the achievement status for the target after the game has started.

9. A non-transitory computer-readable information storage medium storing a program, the program causing a computer to function as a game device for executing a game, the program further causing the computer to function as:

a target output control section for causing, after the game has started, a target which a user needs to achieve in the game to be output, the target output control section comprising, a section for causing a part of a content of the target to be output; and a section for causing the whole of the content of the target to be output after the part of the content of the target is output and the game has started; and a target output standby section for holding the output of the target by the target output control section on standby based on an achievement status of the player for the target wherein the target output standby section holds the output of the whole of the content of the target on standby during the play of the game, based on the achievement status of the player for the target.

10. The non-transitory computer-readable information storage medium of claim 9, wherein the target output standby section comprises:

a section for acquiring content stored in a storage storing an achievement status condition in association with each of a plurality of output time candidates, the achievement status condition being a condition regarding the achievement status for the target;

a section for judging, in a case where any one of the plurality of output time candidates has arrived, whether or not the achievement status for the target at the output time candidate satisfies the achievement status condition associated with the output time candidate; and a section for allowing, in a case where it is judged that the achievement status for the target satisfies the achievement status condition, the target output control section to output the target.

11. The non-transitory computer-readable information storage medium of claim 9, wherein:

the game comprises a game played between one of a first game character and a first game character group, and one of a second game character and a second game character group, the first game character and the first game character group each being an operation subject of the user, the second game character and the second game character group each being an operation subject of one of another user and a computer; and the program further causing the computer to function as a first target changing section for changing the target based on a combination of the one of the first game character and the first game character group, and the one of the second game character and the second game character group.

12. The non-transitory computer-readable information storage medium of claim 9, wherein the program further causes the computer to function as a second target changing section for changing the target based on the achievement status for the target after the game has started.

* * * * *